(No Model.)
W. B. JACKSON.
SEED PLANTER AND GUANO DISTRIBUTER.
No. 299,549. Patented June 3, 1884.
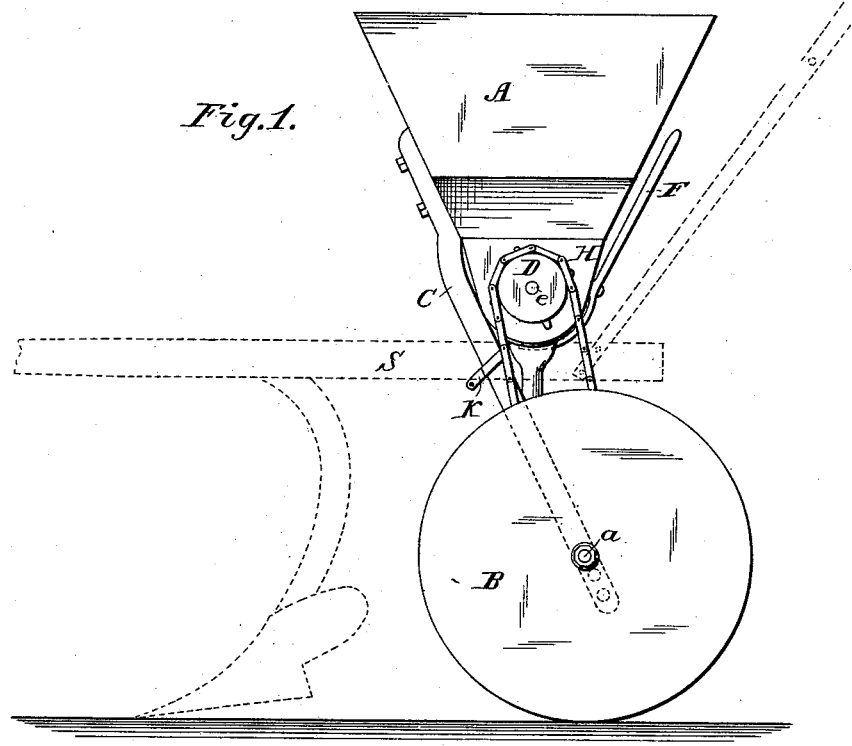
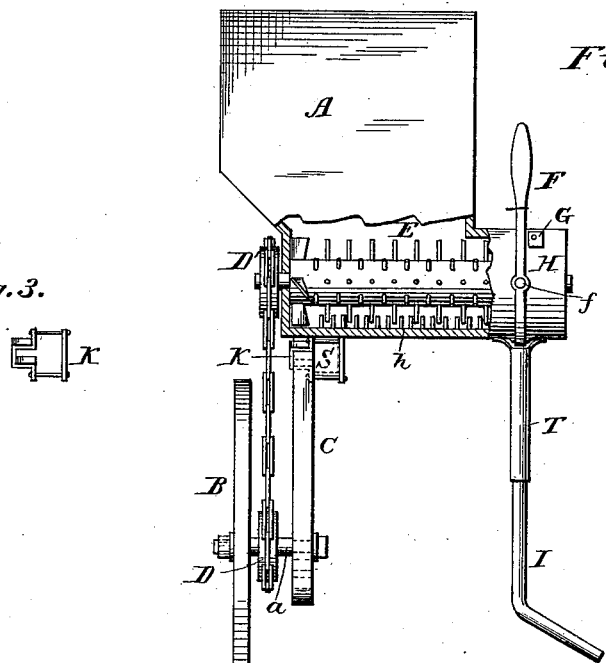
Attest:
Cont. A. Cooper
J. Campbell
Inventor:
Wm B. Jackson
by Faster & Freeman
attys

UNITED STATES PATENT OFFICE.

WILLIAM B. JACKSON, OF HIGH SHOALS, GEORGIA.

SEED-PLANTER AND GUANO-DISTRIBUTER.

SPECIFICATION forming part of Letters Patent No. 299,549, dated June 3, 1884.

Application filed September 14, 1883. (No model.)

*To all whom it may concern:*

Be it known that I, WILLIAM B. JACKSON, a citizen of the United States, and a resident of High Shoals, Walton county, Georgia, have invented certain new and useful Improvements in Seed-Planters and Guano-Distributers, of which the following is a specification.

My invention relates to seed-planters and fertilizer-distributers of the class that may be attached to any ordinary plow; and it consists in such a machine constructed and arranged as more particularly pointed out hereinafter, whereby it may be attached to any part of the stock of a plow. It will be strong, durable, and cheaply made, will distribute the seed or fertilizer evenly, and will not interfere with the working of the plow or other machine to which it is attached.

In order to more particularly describe my invention, reference is made to the accompanying drawings, in which—

Figure 1 is a side view of my machine as attached to a plow. Fig. 2 is a rear view, partly in section; and Fig. 3 is a detail.

The hopper A has attached to it by suitable bolts a connecting-beam, C, carrying a driving-wheel, B, on its lower end. This beam is secured to the shaft S of the plow in any desired position by suitable bolts or clamps, so arranged that the machine may be readily adjusted to any desired position to adapt it to the plow or other instrument to which it is attached and to the work to be done. In Fig. 3 I have shown a clip, K, which I have found very convenient for this purpose, enabling the machine to be readily attached to or detached from the plow-beam. By means of blocks *k*, placed between the clip and the beam, lateral adjustment of the machine may be effected to any extent. The axle *a* of the driving-wheel is adjustably secured to the beam C, and carries a chain driving-wheel, D. Another chain-wheel, D', is attached to the axle *e* of the stirrer or pulverizer E, arranged at the bottom of the hopper A. The pulverizer or stirrer E consists of a cylinder or drum provided with spikes or teeth arranged spirally or screw-like about its surface, so as to carry or feed the seed or fertilizer to the point of discharge. The ends of the stirrer are provided with wings inclined to the plane of its rotation, which, when the stirrer is in motion, throw the contents inward away from the ends of the hopper-chamber to prevent clogging. The hopper-chamber H is provided with spikes or teeth *h*, fixed to the interior thereof, between which pass the teeth of the pulverizer or stirrer, thereby pulverizing the fertilizer, when used, or mixing the seed. To one side of the hopper-chamber is secured a feed-regulator, F, which is pivoted at *f*, and has its end curved and flattened to fit the opening in the bottom of the hopper-chamber, so that it may be adjusted to permit more or less of the seeds or fertilizer to be delivered from the chamber. A polygonal eccentric block, G, is attached to the hopper-chamber in such a position that it may be turned so as to bear upon the feed-regulator F, to hold it in the desired position, so that it will allow the proper amount of material to pass from the chamber.

Other means may be employed for holding the regulator than the eccentric; but I have found that to be a convenient and desirable means.

To the under side of the hopper-chamber, and covering the opening, is fastened a flexible tube, T, the upper end being cut away, to allow the regulator to move over the opening, to the lower end of which is attached an angular metal tube, I. By means of these tubes I am enabled to deliver the seed or fertilizer in any desired position. The tube I being angular, it may be adjusted to deposit the material into the furrow being plowed or the one on the side, and it may be extended so that the discharge will be in the bottom of the furrow, enabling it to be used in very windy weather without danger of loss of the seed or fertilizer. The tube T being flexible allows it to bend or pass by any obstruction without danger of breakage.

The operation of the device is apparent from the above. The hopper being filled with the desired seeds or fertilizer, according as the machine is to be used, and the regulator adjusted and held by the eccentric, as the plow or cultivator advances, the driving-wheel runs along the furrow made by the plow, and by means of the chain or belt upon the chain-wheels the pulverizer or stirrer is rotated, feeding the material toward the exit and into the distributing-tube, when it is delivered in the desired places. From this it will be seen that I have a very simple, durable, and effective device, that may be readily adjusted to distribute the seeds or fertilizer in front or at the rear of the plow without interfering with the work of the plow.

I claim—

1. In a seed and fertilizer distributer, the combination, with beam or bracket C, carrying a driver-wheel at one end, of a hopper supported on said beam, having a mixing and feeding cylinder and distributing-pipe, and connections between the driving-wheel and the cylinder, the whole being adapted to be detachably secured to an ordinary plow.

2. The combination, with the mixing-chamber H, having a suitable regulating-valve, of a flexible pipe secured over the valve, and a bent rigid pipe adjustably connected to the flexible pipe, as set forth.

3. The combination, with a beam or bracket carrying a driving-wheel at one end, of a feed-hopper having a mixing-chamber and stirrer therein, adjusting-regulator, and a flexible pipe having a rigid bent nozzle attached thereto, the arrangement being such that the whole is adapted to be attached to an ordinary plow.

In testimony whereof I have signed my name to this specification in the presence of two subscribing witnesses.

WILLIAM B. JACKSON.

Witnesses:
W. A. ELDER,
WASH B. JACKSON.